United States Patent [19]

Mos

[11] 4,028,734
[45] June 7, 1977

[54] PLURAL MAGNETIC HEAD ASSEMBLY WITH INDEPENDENTLY SUPPORTING STRUCTURE

[75] Inventor: Robert J. Mos, Huntington Beach, Calif.

[73] Assignee: American Magnetics Corporation, Torrance, Calif.

[22] Filed: Sept. 22, 1976

[21] Appl. No.: 725,902

Related U.S. Application Data

[63] Continuation of Ser. No. 578,449, May 19, 1975, abandoned.

[52] U.S. Cl. .............................................. 360/104
[51] Int. Cl.² ...................... G11B 21/16; G11B 5/48

[58] Field of Search .......... 360/104, 102, 103, 109, 360/129, 121

*Primary Examiner*—Robert S. Tupper
*Attorney, Agent, or Firm*—Jessup & Beecher

[57] ABSTRACT

A magnetic stripe head assembly comprised of a support having a plurality of transducer heads mounted on leaf springs attached at one end to the support and at the opposite end to the transducer heads. The leaf springs permit individual translation of each transducer head to compensate for deformities in recorded material. The opposite side of the support provides a stop to limit the translation of the individual transducer head. A pair of gimbal sockets are provided on the support to permit the transducer head assembly to be pivotally mounted.

7 Claims, 5 Drawing Figures

PLURAL MAGNETIC HEAD ASSEMBLY WITH INDEPENDENTLY SUPPORTING STRUCTURE

This is a continuation of application Ser. No. 578,449, filed May 19, 1975 and now abandoned.

BACKGROUND OF THE INVENTION

This invention relates generally to transducer head assemblies and more particularly to transducer head assemblies in which there are a plurality of transducer heads mounted therein.

It has long been recognized that a problem exists in reading simultaneously all three channels on a card having magnetic strips with a single-head structure because the strip surface is bowed and in general forms a concave cylinder, having an axis parallel to the direction of the card movement across the head. Consequently, pneumatic gap line which lies in a plane cannot simultaneously make contact with the entire magnetic strip surface and the sagittal separation causes spacing losses in one or more of the channels.

This invention provides a solution to the problem and consists of a special transducer head assembly especially suitable for reading three channels on credit cards having parallel magnetic strips or other magnetic strip media. The invention consists of means for providing compliance for each of three jointly mounted magnetic heads, such that each head can individually track its respective channel independent of distortions in the track or warpage in the card. Intimate contact between the magnetic media and the heads is maintained and spacing losses are minimized. An additional advantage of this head assembly is that the individual heads can have different core structures. That is, some heads are for read only, while other heads can have core structures which permit them to be used for both reading and writing. Either of these heads can be mounted in this mounting assembly because of the individual translation permitted.

It is an object of the transducer head assembly of this invention to permit the heads to translate individually.

Another object of the present invention is to permit the individual tracking heads to compensate for distortions in the recorded material.

Another object of the present invention is to permit the mounting of heads on a single assembly which can have different core structures.

These and other objects of the present invention will become apparent when the detailed description is considered in conjunction with the accompanying drawings.

DETAILED DESCRIPTION OF THE PREFERRED EMBODIMENT OF THE INVENTION

Figure 1:
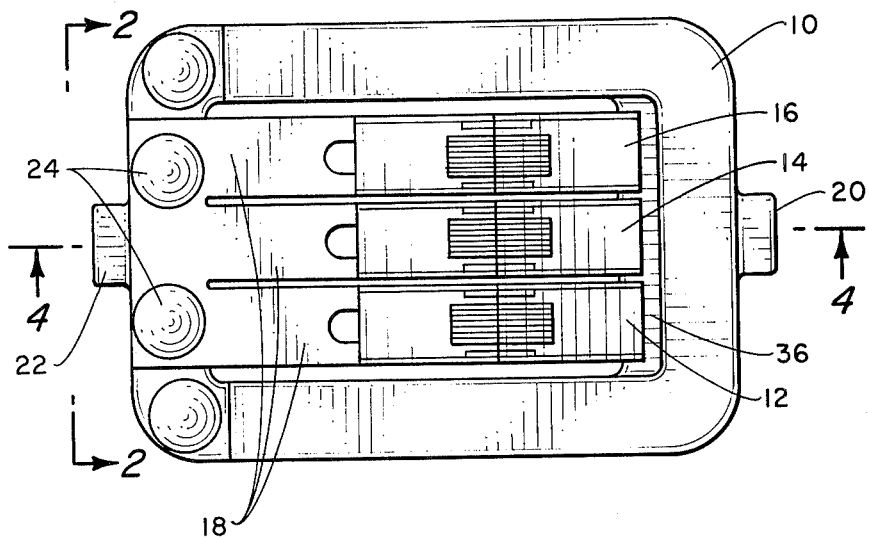
FIG. 1 is a front elevation of the transducer head mounting assembly.

Referring now to FIG. 1, there is shown a transducer head mounting assembly comprised of a support 10, transducer heads 12, 14 and 16, and leaf springs 18 attached to the support at one end and to the transducer heads at the opposite end. Preferably the support 10 is a rectangular frame or ring provided with gimbal sockets 20 and 22 on either end. The leaf springs 18 are substantially parallel, forming a parallelepiped and are attached to the support 10 by any suitable means 24 such as screws or rivets.

Figure 3:
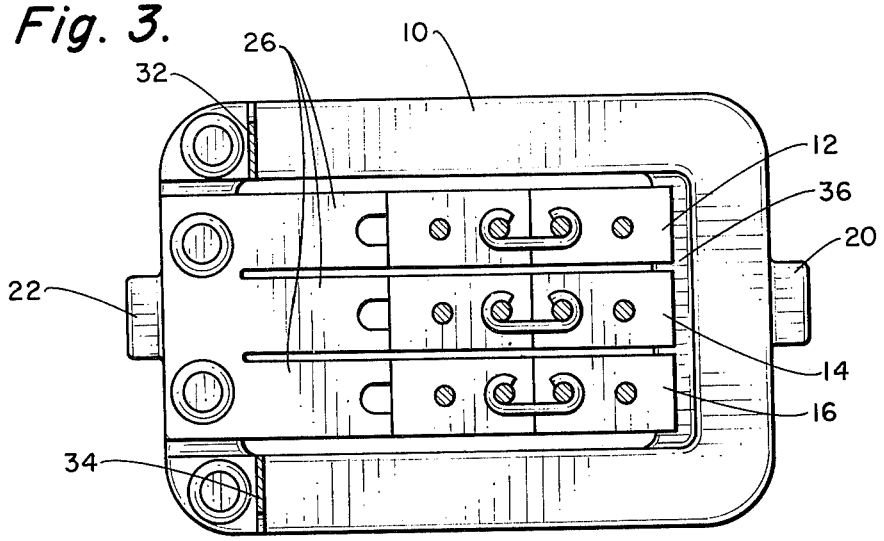
FIG. 3 is a rear view of the transducer mounting head assembly taken along 3—3 of FIG. 2.

The rear view of the transducer head mounting assembly of FIG. 3 shows a second set of leaf springs 26 for supporting the transducer heads 12, 14 and 16. Each leaf spring 18, 26 can be individual or have a common base as shown in the figures. The mounting of the leaf springs 18, 26 can best be seen in FIG. 4, in which identical reference numerals are used to identify like parts. The leaf springs 18 and 26 are attached to the housing 10 by screws or rivets 24 and are attached to the transducer head 14 by being embedded in the insulated housing 28 at 30. The leaf springs 18, 26 are retained in the slots of the insulated housing 28 of the transducer 14 with an adhesive compound.

In order to limit the translational motion of the transducer heads 12, 14 and 16, a shoulder 36 is provided on frame 10 which engages a slot 38 in the transducer heads. This can best be seen in FIG. 4. The slot 38 is large enough to allow sufficient translation to track any deformities in the cards while preventing excessive bending of the springs 18 and 26.

Figure 2:
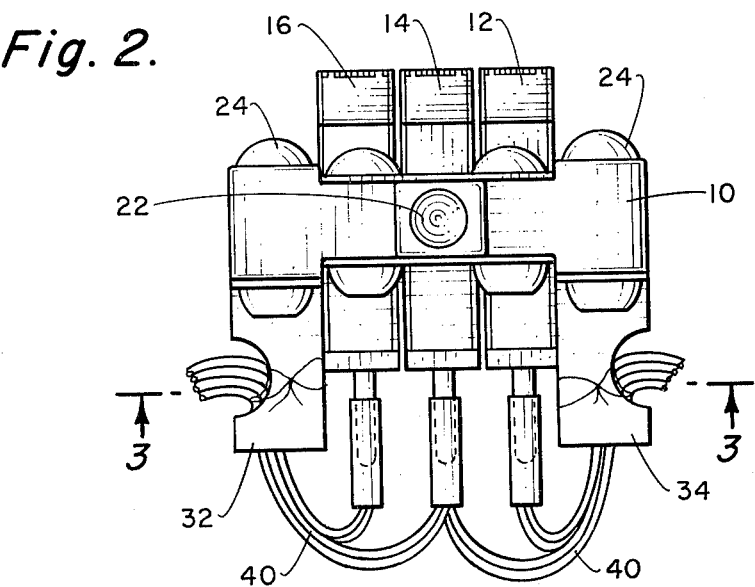
FIG. 2 is a view of the transducer head mounting assembly taken along 2—2 of FIG. 1.
Figure 5:
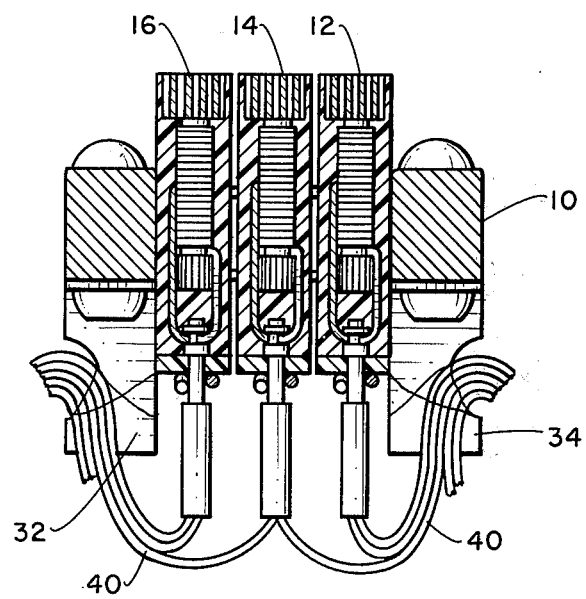
FIG. 5 is a sectional view taken along 5—5 of FIG. 4.

The tabs 32 and 34 are fastened to the frame 10 for the purpose of providing tie-downs for electrical leads 40, as shown in FIGS. 2 and 5, to dress the electrical leads away from the transducer heads. The electrical leads 40 are tied down to provide a constant loop which will not impede the translational movement of the transducer heads.

As can be seen in FIG. 5, the tracking edge of each transducer head 12, 14 and 16 extends out of the frame 10 so that it may bear against the planar surface of the credit card magnetic track. Also, each transducer head 12, 14 and 16 is relatively thin and the mounting springs 18, 26 are generally parallel and disposed in the plane of each head.

Figure 4:
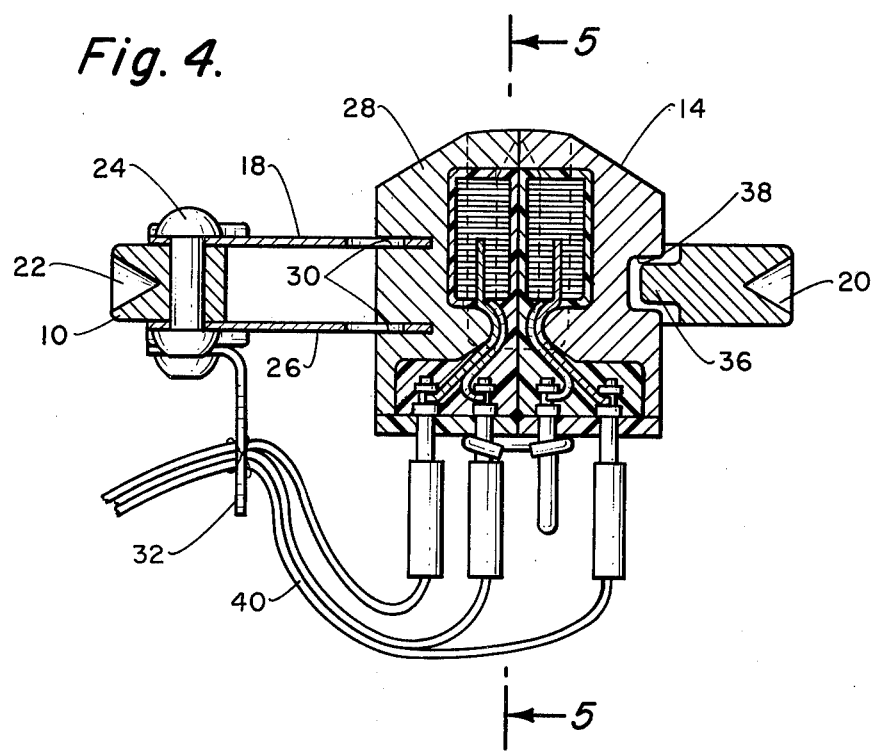
FIG. 4 is a sectional view taken through one of the transducer heads taken along line 4—4 of FIG. 1.

Since the leaf springs 18 and 26 are attached to the transducer heads 12, 14 and 16 to permit only translational movement, without rotation, the sockets 20 and 22 are provided. These sockets permit the transducer head assembly to be pivotally mounted. The sockets 20 and 22 are formed as an integral part of the frame 10 at the top and bottom as is shown in FIGS. 1 and 4. The entire frame 10, including the sockets 20, 22 and shoulder stop 36, should be constructed of a non-magnetic material, such as a non-magnetic metal or plastic.

Obviously, many other modications and variations of the present invention are possible in the light of the above teaching. It is therefore to be understood that within the scope of the intended claims the invention may be practiced otherwise than as specifically described.

What is claimed is:

1. Signal transducing magnetic head assembly means comprised:
    a carrier frame,
    mounting means on said frame for pivotally mounting said frame,
    a plurality of magnetic heads disposed within said frame,
    each said head being mounted to said frame by a plurality of parallel elongate leaf springs substantially forming a parallelepiped, each spring having one end fixedly mounted to said frame and the opposite end fixedly mounted to its corresponding head, whereby, by flexing of said springs, each said head may translate individually, without rotating, on a line substantially normal to the plane of said frame.

2. The head assembly according to claim 1 wherein said mounting means comprises sockets on opposite ends of said frame whereby said head assembly may rotate about an axis parallel to said elongate springs.

3. Head means in accordance with claim 1, wherein:
each said head is relatively thin and the mounting springs of the head are substantially parallel and disposed in the plane of the head so that the translation of the head is substantially in head plane, the edge of each said head extending out of said frame plane and being adapted to bear against a substantially planar surface, the individual flexing of each said head permitting substantially uniform bearing pressure of the head against the surface, thereby to accommodate the head means to lateral non-uniformity of the surface.

4. Head means in accordance with claim 1, wherein:
said frame is generally rectangular,
said one end of each said spring being mounted to one side of said frame, and including stop means on the opposite side of said frame engageable with each said head for limiting the translating excursion of the head.

5. The head assembly according to claim 4 wherein said stop means comprises:
an integral flange on the inside surface of said frame opposite the end to which the springs are fixedly mounted, slots in said heads engageable with said integral flange to act as a stop whereby the flexing of said springs and translational movement of said heads is limited.

6. Signal transducing magnetic head assembly means comprising:
a carrier support,
pivotal mounting means on said support for pivotally mounting said carrier,
a plurality of magnetic heads mounted on said support,
each said head being mounted to said support by a plurality of parallel elongate leaf springs substantially forming a parallelepiped,
whereby each said head may translate individually by flexing of said springs, without rotating, on a line substantially normal to the plane of said support.

7. Signal transducing magnetic head assembly means according to claim 6 wherein,
each spring has one end fixedly mounted to said support and the opposite end fixedly mounted to its corresponding head.

* * * * *